CENTRIFUGAL ACTUATOR FOR LIMITED SLIP DIFFERENTIAL

Original Filed Sept. 17, 1969 4 Sheets-Sheet 1

INVENTOR.
William C. Ottemann
BY
Teagno & Toddy
ATTORNEY.

CENTRIFUGAL ACTUATOR FOR LIMITED SLIP DIFFERENTIAL

Original Filed Sept. 17, 1969 4 Sheets-Sheet 2

INVENTOR.
William C. Ottemann
BY
Teagno & Toddy
ATTORNEY

CENTRIFUGAL ACTUATOR FOR LIMITED SLIP DIFFERENTIAL

Original Filed Sept. 17, 1969 4 Sheets-Sheet 3

INVENTOR.
William C. Ottemann

BY Teagno & Toddy

ATTORNEY.

CENTRIFUGAL ACTUATOR FOR LIMITED SLIP DIFFERENTIAL

Original Filed Sept. 17, 1969 4 Sheets-Sheet 4

INVENTOR.
William C. Ottemann
BY
Teagno & Toddy
ATTORNEY.

United States Patent Office

Re. 28,004
Reissued May 7, 1974

28,004

CENTRIFUGAL ACTUATOR FOR LIMITED SLIP DIFFERENTIAL

William C. Ottemann, Union Lake, Mich., assignor to Eaton Corporation, Cleveland, Ohio Original No. 3,606,803, dated Sept. 21, 1971, Ser. No. 858,700, Sept. 17, 1969. Application for reissue June 7, 1973, Ser. No. 367,860
Int. Cl. F16d *13/04;* F16h *1/44*
U.S. Cl. 74—711 35 Claims

Matter enclosed in heavy brackets [ ] appears in the original patent but forms no part of this reissue specification; matter printed in italics indicates the additions made by reissue.

ABSTRACT OF THE DISCLOSURE

A limited slip differential mechanism having a normally disengaged main clutch producing lock-up when activated, which is operated by means of an actuator device in turn activated by a predetermined level of differential action which is varied with the rate of change of levels of differential action. The actuator includes an actuator member which is rotationally driven by differential action and upon which spring-biased centrifugal weights are pivotally mounted and arranged so that at a predetermined velocity and acceleration of the actuator member one of the weights move outwardly and applies a braking force to the actuator member inhibiting its rotation. An arrangement is provided for actuation of the normally disengaged main clutch in response to this inhibited rotation, so that the differential action is uninhibited at low levels of differential action. A high road speed cutout of the actuator is also provided so that no lock-up will occur at relatively high road speeds.

BACKGROUND OF THE INVENTION

This invention is related to limited slip differentials and more particularly to such differentials in which the slip inhibiting mechanism is wholly inoperative until predetermined levels of differential action and rate of change of differential action are reached.

Prior art limited slip differentials have for the most part included mechanisms which produce an inhibiting action on the differential at all levels of differentiation. While this arrangement is satisfactory from the standpoint of vehicle stability on dry pavement since the inhibiting force levels produced during normal turning operations is low enough to have a negligible effect on the vehicle stability, on slippery roads this inhibiting action can produce vehicle instability during turning maneuvers. Furthermore, even on dry pavement tire wear is increased due to the scrubbing action during turns.

Some prior art limited slip differentials have attempted to solve this problem by providing a lock-up clutch which remain totally unengaged until a predetermined level of differential action occurs, and then is engaged at that point. However, the actuation means has relied on viscous or frictional forces, and tends to be unreliable through extremes of temperature and wear. Other devices would produce sudden applications of the clutch, producing a harsh shock upon lock-up.

Hence, it is an object of the present invention to provide an improved limited slip differential in which low levels of differential action are wholly uninhibited, but which locks up under conditions of high levels of differential action and rates of change of differential action, indicating a wheel spin condition.

It is a further object to provide a limited slip differential in which the point of lock-up is reliably and accurately controlled.

Another object of the present invention is to provide a centrifugal actuator suitable for use in this type of differential which produces a smooth clutch actuation reliably and accurately.

SUMMARY

These and other objects which will become apparent upon a reading of the following detailed description and the appended claims are accomplished by providing a member which is rotationally driven by the differential action, and which is arranged to actuate a lock-up clutch upon attaining a predetermined angular velocity and acceleration, indicating a wheel spin condition.

DETAILED DESCRIPTION

Figure 1:
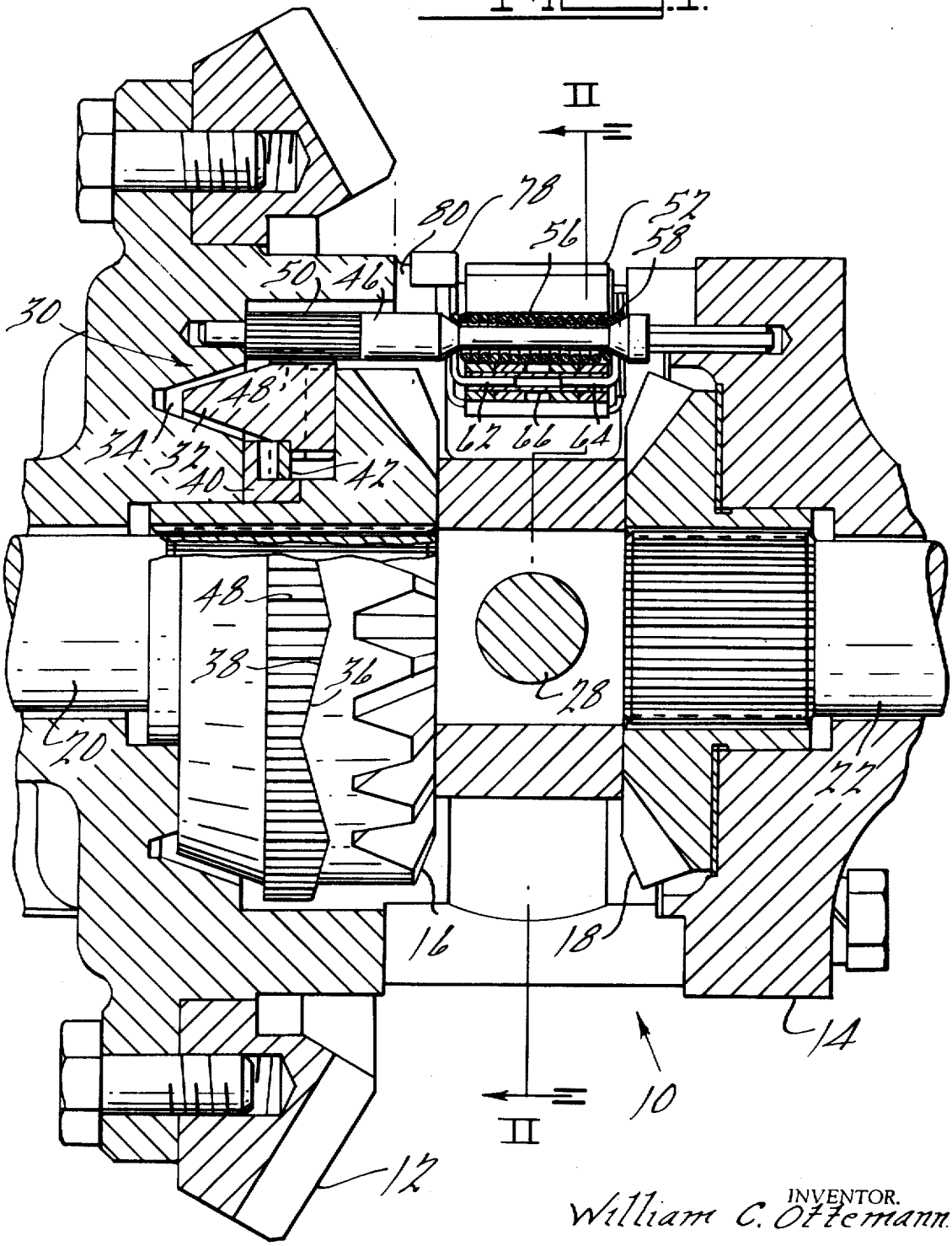
FIG. 1 is a plan view in partial section of a differential incorporating an actuator according to the present invention.
Figure 2:
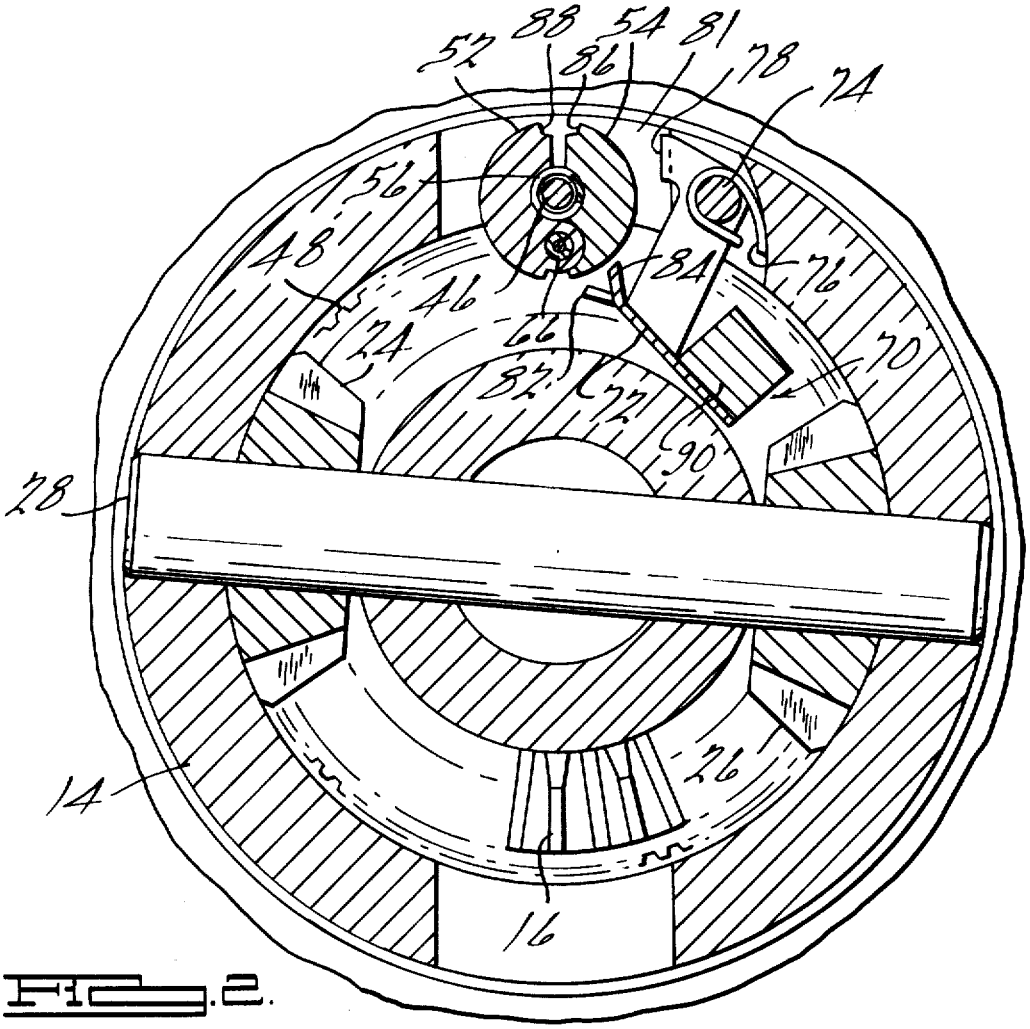
FIG. 2 is a view of the section taken along the line II—II in FIG. 1.
Figure 3:
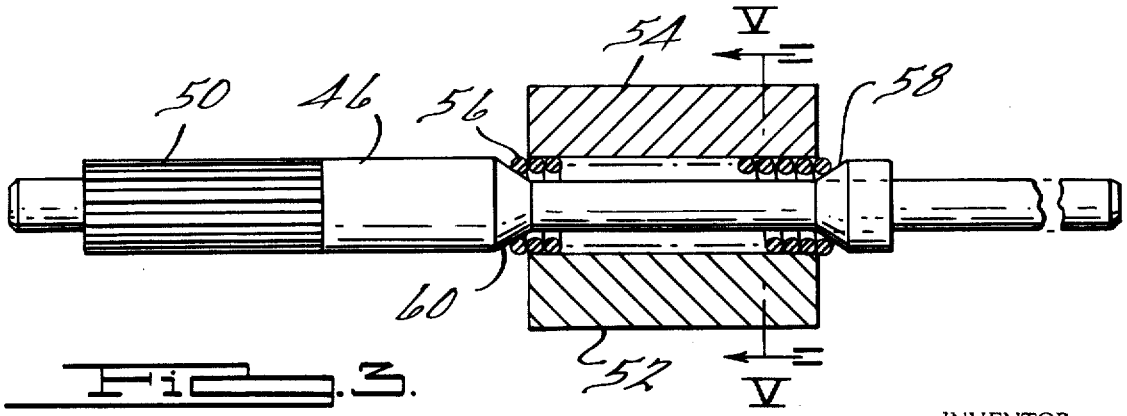
FIG. 3 is a detail in partial section of the actuator shown in FIG. 1.

Referring now to the drawings and particularly to FIG. 1, 10 indicates a planetary differential mechanism having an input ring gear 12 secured to a differential carrier housing 14. Rotatably supported therein are a pair of side gears 16 and 18, splined to the axles 20 and 22, which mesh with the planet pinions 24 and 26 (FIG. 2). The planet pinions 24 and 26 are rotatably mounted to shaft 28 which is in turn secured to the carrier housing 14.

In order to lock up the differential 10 a clutch mechanism 30 is provided, which will act when actuated to clutch together the side gear 16 and the carrier housing 14 to lock up the differential. This clutch 30 is comprised of a double coned wedging member 32, cooperating with a pocket 34 formed in the carrier housing 14. The wedging member 32 is drivingly connected to the side gear 16 via wedging ramp surfaces 36 and 38 formed in the wedge member 32 and side gear respectively. These ramp surfaces will serve to actuate the clutch when relative rotative movement between the side gear 16 and the wedge 32 is induced in a manner to hereinafter be described.

Biasing of the wedge 32 to the right opposing actuation in FIG. 1 is accomplished by retainer 40 pressed onto side gear 16 and wave spring 42 engaging the retainer 40 and the wedge 32.

Rotatably mounted in the carrier housing 14 is a centrifugal actuator assembly 44. This actuator is provided with a pin 46 having integral at one end a pinion gear 50 drivingly engaging the wedge 32 via teeth 48 formed about it periphery. Supported on the pin 46 are a pair of centrifugal weights 52 and 54 surrounding a drive spring 56. Drive spring 56 is compressed between shoulders 58 and 60, connected to pin 46, so as to create a frictional drive therebetween. This drive is transmitted to the weights 52 and 54 via end sections 62 and 64 (FIGS. 1 and 5) of the drive spring 56 inserted into split pin 66 which serves to pivotally connect the weights 52 and 54. This drive connection also serves to locate the connected weights 52 and 54 with respect to the pin 46.

Figure 4:
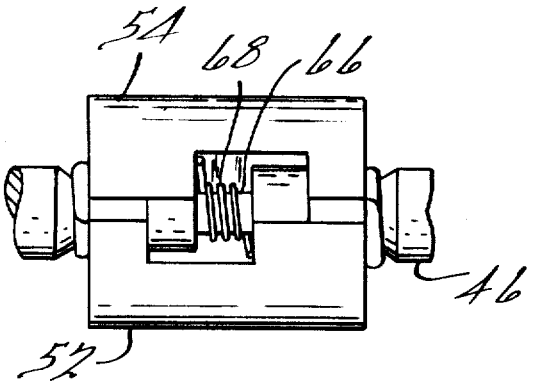
FIG. 4 is a detail view of the actuator showing the assembly of the centrifugal weights.
Figure 5:
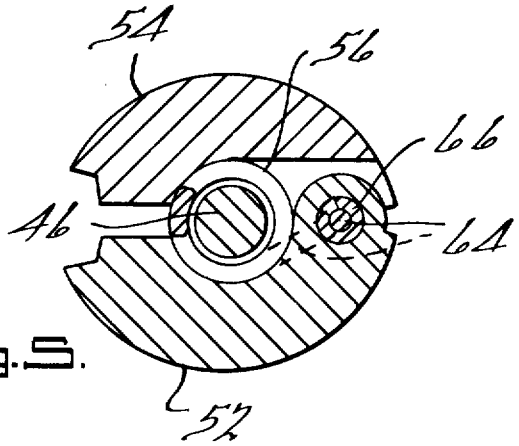
FIG. 5 is a view of the section taken along the line V—V in FIG. 3.

Weights 52 and 54 are spring loaded inwardly by means of a spring 68 (FIG. 4) mounted on split pivot pin 66, so that in the absence of centrifugal force they assume the position shown in FIGS. 2 and 5.

Pivotally mounted to the carrier housing 14 is a stop assembly 70 (FIG. 2) which includes a tab member 72 pivotally mounted via pin 74 to the carrier housing 14, and is located in the position shown in FIG. 2 by means of a spring 76 tending to bias the tab member in a clockwise direction as viewed in FIG. 2 and by means of a stop tab 78 (FIGS. 1, 2) cooperating with a shoulder 80 formed on the opening 81 in the carrier housing which accommodates the actuator assembly 44.

Tab member 72 is provided with a pair of stop tabs 82, 84 designed to cooperate with end notches 86, 88 formed in the ends of weights 54, 56 when the weights are extended away from the pin 46 due to centrifugal and inertia forces, as will hereinafter be described more fully.

Fixed to tab member 72 is a weight 90 which is positioned so that rotation of the carrier housing 14 produces centrifugal force tending to rotate the tab member 72 about pin 74 against spring 76 so as to move stop tabs 82, 84 away from the weights 52, 54.

OPERATION

From the above description it should be clear that unless the cltuch 30 is engaged, normal differential action will occur, wholly uninhibited, since no lock-up forces exist until the time of clutch engagement except for the frictional and inertia forces in actuator mechanism 44, and the other driven parts. Wavespring 42 insures that the wedge member 32 will not be forced over by the ramps 36, 38 reaching to the inertia of the wedge member 32 nor the inertia or friction forces created by the actuator assembly 44 which is driven by the wedge 32 during differential action.

Figure 6:
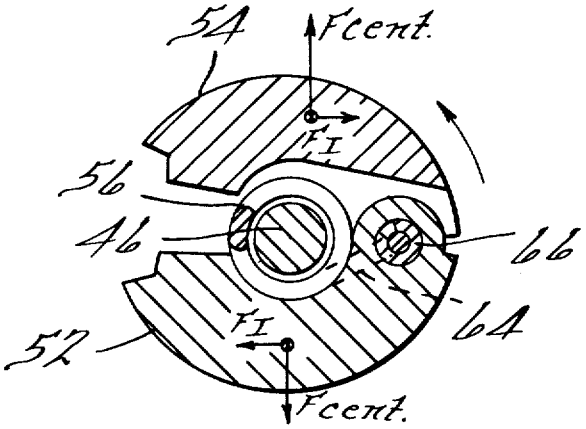
FIG. 6 is a schematic view of the weights acting under the forces produces by angular acceleration and velocity of the actuator assembly in the counterclockwise direction.
Figure 7:
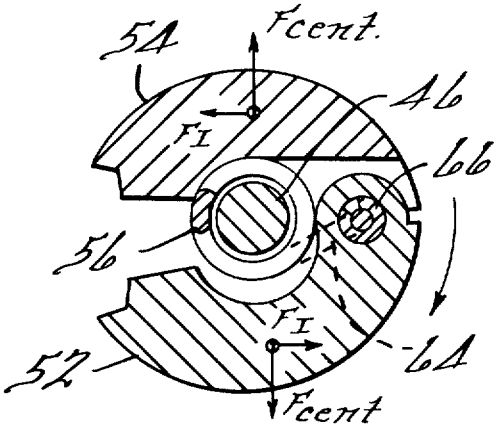
FIG. 7 is a schematic view of the weights acting under the forces produced by angular acceleration and velocity of the actuator in the clockwise direction.

When differential action has reached a predetermined level, indicating a wheel spin condition, the angular velocity and acceleration of the pin 46 and carried weights 52, 54 will be sufficient to cause one or the other of these weights to move away from the pin 46 and drive spring 56 against the bias of spring 68 and to engage either one or the other of the stop tabs 82, 84. As shown in FIGS. 6 and 7, the forces acting on the weights 52, 54 are such that the proper weight will move outwardly depending on the direction of rotation of the pin 46, which will be driven in one direction or the other, depending on which wheel is overtraveling the other. If the assembly is spinning counterclockwise, the inertia force, $F_I$, of the weight 54 will be tending to open the weight, i.e., to move it away from pin 46 and drive spring 56, while the inertia force $F_I$ of weight 52 will be tending to hold it closed. Hence, when the centrifugal force $F_{cent}$, combined with the inertia force on weight 54 reaches sufficient level to overcome spring 68, this weight will move out to engage stop tab 82.

It should be emphasized that the responsiveness of the weights to both velocity and acceleration provides a superior wheel spin indicator since accelerator levels are generally much higher in a wheel spin condition than during a turning maneuver for a given level of differential action. Hence, under conditions of rapidly changing differentiation, the point of clutch lock-up will occur at lower levels of differential action than under conditions of slow changing differentiation, thus yielding a more accurate and reliable lock-up action: This responsiveness to acceleration is of course dependent on the drive ratios of the pin 46 to the wedge member, the geometry of the drive connection with the weights, the mass of the weights, the bias of the springs 68, etc.

Since both weights 52, 54 are biased by the same spring 68, weight 52 is further held inward by the increased tension of the spring 68 when the weight 54 moves outwardly and tends to keep weight 52 held inward regardless of the level of centrifugal or inertial forces developed.

As shown in FIG. 7, the reverse is true upon clockwise rotation of the pin 46.

Hence, the proper weight to engage the properly directed stop tab 82 or 84 will move outwardly first.

Upon engagement of one of these weights 52, 54 with a respective tab 84, 82, a braking force will be developed tending to restrict rotation of pin 46 about its own axis. While weights 52, 54 are positively braked from further movement, pin 46 is acted on through the frictional connection of the drive spring 56 acting on the shoulders 58 and 60, which limits the amount of braking torque acting on the pin 46.

This braking force acts as a retarding force on wedge member 32 by virtue of the drive connection of the gear teeth 48, 50. This retarding force in turn activates the ramps 36, 38 and causes the wedge member 32 to overcome the bias of wavespring 42 and move to engage the cone portion 32 with the pocket 34, and once in contact, the self energizing action of the cones fully engages the clutch, thus locking up the differential and precluding further differential action.

This lock-up is accomplished smoothly and without grabing or chatter since the retarding force is limited by the torque limiting drive of the drive spring 56. In addition, it can be seen that differential action is completely uninhibited at low levels of differential action, while completely precluded at higher levels due to the discrete actuation characteristics of the clutch actuation mechanism.

Upon an increase in road speed sufficient for the bias of spring 76 to be overcome by the centrifugal force of the weight 90, tab member 72 rotates about pin 74 so as to move tab stop portions 82, 84 out of reach of the weights 52, 54 in their extended position. Hence, the differential locking mechanism will be nullified at high road speeds, serving to retain vehicle control upon encountering slippery patches of road at these relatively high road speeds.

Upon the cessation of differential action and the reversal of drive between ramps 36, 38, wavespring 42 will disengage clutch mechanism 30.

Figure 8:
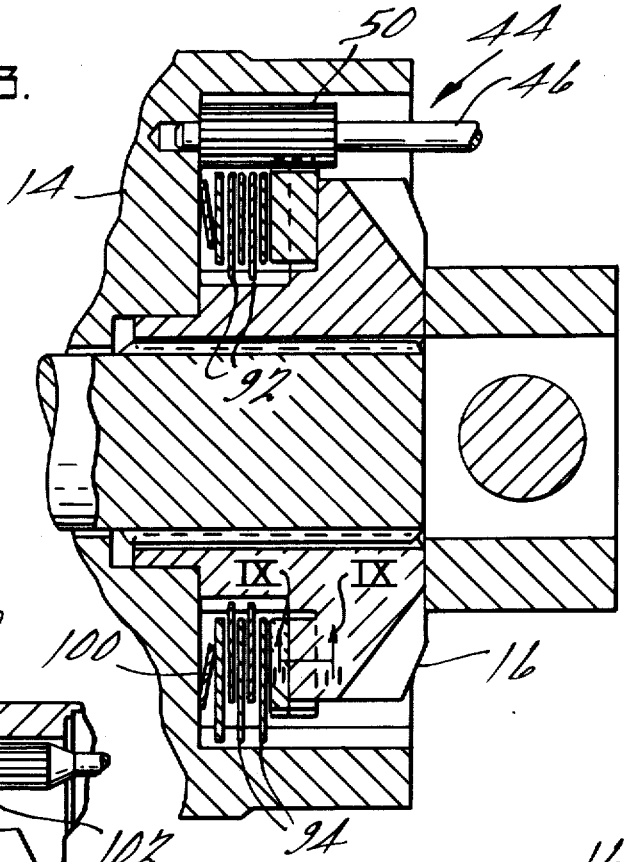
FIG. 8 is a partial view of a differential using an alternate type of clutch operated by an actuator according to the present invention.
Figure 9:
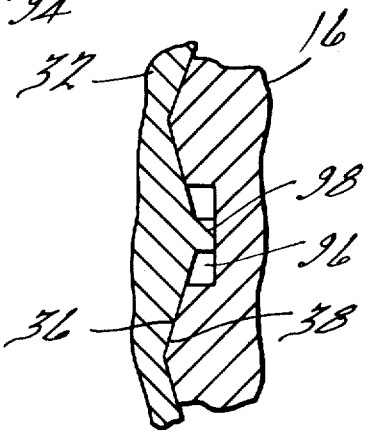
FIG. 9 is a view of the section taken along the lines IX—IX in FIG. 8.

An alternate embodiment is shown in FIGS. 8 and 9, in which a friction disc clutch is substituted for the cone clutch of the embodiment of FIGS. 1–7. In this embodiment, the centrifugal actuation mechanism 44 is the same, having a pin 46 and pinion gear 50 drivingly engaging a wedge member 32. Upon energization of the centrifugal actuation mechanism 44 the wedge member 32 is driven by the ramps 36, 38 to cause the friction discs 92, 94 which are keyed to the side gear 16 and carrier housing 14 respectively to be clutched together and to lock up the differential. Since the first friction disc 94 encountered is keyed to the carrier housing 14 and the wedge member 32 is drivingly connected to the side 16 via ramps 36, 38, a self energization effect is obtained by the differential speed between those elements reacting with the ramps 36, 38. As shown in FIG. 9, the compression of the discs 92, 94 by the wedge member 32 is limited by a projection 98 cooperating with an opening 96 serving to limit rotative movement between the side gear 16 and the wedge member 32, and hence limit linear travel of the wedge member 32. An actuation reaction is provided by Belleville back-up spring 100.

Figure 10:
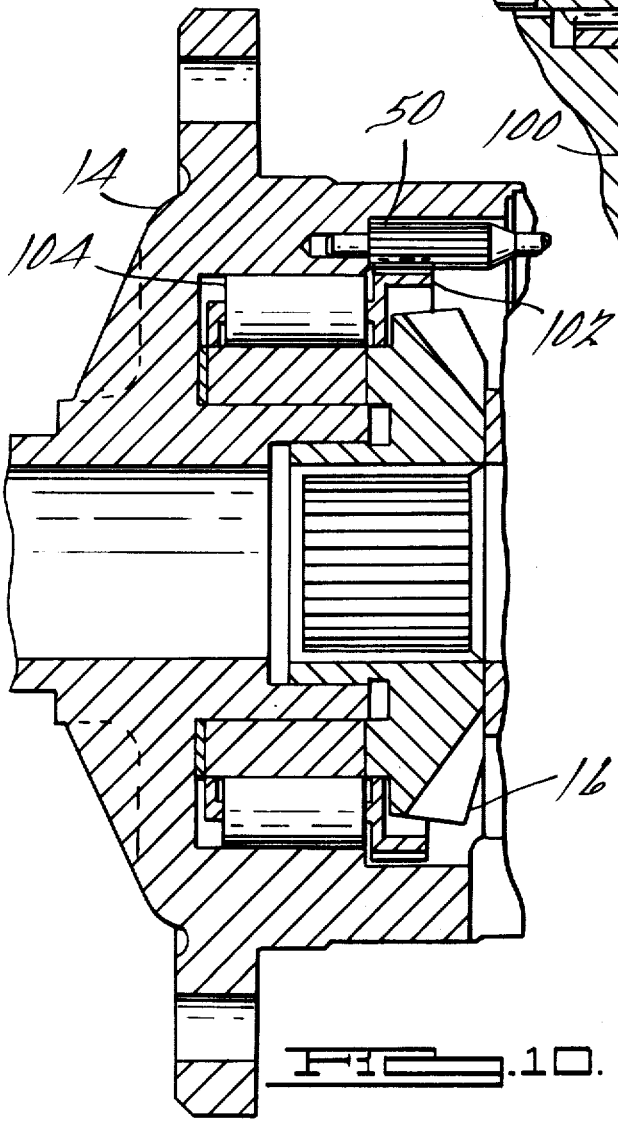
FIG. 10 is a partial view of a differential using another alternate lock-up clutch operated by an actuator according to the present invention.

Another embodiment is shown in FIG. 10, in which a roller clutch is substituted for the cone clutch 30 shown in the embodiment of FIGS. 1–7. In this embodiment a roller clutch of the type having a series of rollers 104 and cage member 102 which controls their locking action is controlled by the actuation mechanism 44 according to the present invention. This is accomplished by providing a geared connection with the pinion 50 and the cage 102. As is described in U.S. Pats. 3,324,744 and 3,448,636 which may be referred to for a more complete description of the roller clutch, differential action is uninhibited as long as the cage 102 is free to rotate with respect to carrier housing 14, but upon the development of a significant drag force therebetween, the rollers lock together the carrier housing 14 and the side gear 16, and hence eliminate further differential action. This retarding force is provided according to the present invention by the centrifugal actuation methanism 44 acting through pinion 50.

From the above detailed description it will be appreciated that a simple, reliable mechanism has been provided to actuate a lock-up clutch in a differential so as to have wholly uninhibited differential action at low speeds, a smooth lock-up levels and rates of change of levels of differential action indicating wheel spin, and a nullification of the lock-up mechanism at high road speeds, all cooperating to retain maximum vehicle stability and control, while obtaining excellent tractive ability on slippery drive surfaces.

It is understood that the invention may be practiced in a variety of forms, substituting equivalents for the various elements described.

I claim:

1. In a planetary differential having a plurality of driving members including an input and two output members the improvement comprising:

an actuator member;

driving means driving said actuator member in response to differential movement of said members;

a clutch mechanism normally disengaged operable to lock up said differential;

actuation means producing actuation of said clutch mechanism by said actuator member in response to a predetermined drive level of said actuator member, including means creating a [locking] *retarding* force on said actuator member *and means responsive to the application of a retarding force to said actuator member for actuating said clutch means,* whereby said differential is locked up when a predetermined level of differential action occurs.

2. The differential of claim 1 wherein said actuation means further includes means producing said actuation of said clutch mechanism at predetermined drive levels of said actuator member varying with the acceleration of said actuator member, whereby said predetermined level of differential action causing lock-up varies as the rate of change of differential action changes.

3. The differential of claim 1 wherein said actuation means further includes means limiting the [locking] *retarding* force applied to said actuator member in response to said predetermined drive level.

4. The differential of claim 1 wherein said [locking] *retarding* means includes at least one element driven by said actuator and means for positively locking said at least one element against said drive to [said] one of said [other] *driving* members in response to said predetermined drive level and further including force limiting means between said element and said actuator member to limit the [locking] *retarding* force transmitted thereby.

5. The differential of claim 4 wherein said clutch mechanism includes an engagement element driven by another of said [differential elements] *driving members* and said driving means includes means providing a driving connection between said engagement element and said actuator member [and also includes means actuating said clutch mechanism in response to said locking force acting on said actuating member].

6. The differential of claim 5 wherein said [actuating] means *responsive to application of a retarding force* includes a wedging connection between said engagement member and said [another differential] *other driving* member.

7. The differential of claim 1 wherein said actuator member is rotatably driven in response to said differential movement by said driving means.

8. The differential of claim 7 wherein said actuation means also includes means varying said predetermined drive level as a function of the angular acceleration of said actuator member.

9. The differential of claim 7 wherein said driving means includes means rotatably mounting said actuator member on one of said [differential] *driving* members and also includes means providing a driving connection between said actuator member and another of said [differential] *driving* members.

10. The differential of claim 9 wherein said actuation means includes brake means producing a [locking] *retarding* force on said actuator member tending to prevent said rotation in response to said predetermined level of differential movement.

11. The differential of claim 10 wherein said brake means includes at least one element driven by said actuator member and also includes locking means locking said at least one element to said one [differential] *driving* member in response to said predetermined differential movement.

12. The differential of claim 11 wherein said brake means also includes a torque limiting drive connection between said at least one element and said actuator member.

13. The differential of claim 12 wherein said locking means includes means mounting said at least one element so as to be capable of movement in response to centrifugal force generated by said rotation and further includes stop means on said [another] *one* of said [differential] *driving* members mounted to engage said at least one element in a position of its travel in response to said centrifugal force and also includes means controlling said movement so as to cause said at least one element to engage said stop means at a rotational speed corresponding to said predetermined level of differential movement.

14. The differential of claim 13 wherein said means mounting said at least one element includes means influencing said movement by inertial forces created by acceleration of said at least one element.

15. The differential of claim 13 wherein said means controlling said movement includes resilient bias means resiliently biasing said at least one element against movement in response to said rotational movement.

16. The differential of claim 13 wherein said braking means includes a pair of elements driven by said actuator member and wherein said stop means includes a pair of stop portions engageable with a respective element in a position of its travel in response to said centrifugal force and also includes means controlling the relative response of said elements to said centrifugal force so as to cause one of said elements to move to engage a respective stop portion, before the other of said elements moves to engage said stop portions in one direction of rotation of said actuator member and to cause said other element to move to engage the other stop portion in response to said rotation in the other direction before said one element moves to engage its respective stop portion, and further includes means preventing the one or the other element from moving to engage said stop portion when the other of either of said one or the other element has moved to engage said stop portion.

17. The differential of claim 13 further including null means nullifying said stop means upon reaching a predetermined speed of said [input member] *one of said driving members* of said differential, whereby said actuating means is prevented from actuating said clutch at speeds in excess of said predetermined speed of said input element.

18. The differential of claim 17 wherein said null means includes a weight mounted to respond to centrifugal force generated by rotation of said [input member] *one of said driving members* and also includes means preventing said stop means from engaging said at least one element in response to movement of said weight corresponding to said predetermined speed of said input element.

19. A centrifugal actuator comprising:

a drive element;

a pair of weights;

means rotatably mounting said weights with respect to said drive element so as to allow rotation away from said drive element;

means drivingly connecting said weights and said drive element [as] *so* as to cause said weights to rotate with said drive element and including a connection therebetween which creates inertia forces tending to rotate the weights in directions tending to move one weight toward and the other way from said drive member in response to angular acceleration of said drive element in one direction and tending to move said weights in the opposite relative direction in response to acceleration of said drive member in the other direction; means engaging said weights upon a predetermined travel away from said drive element, including a pair of stop portions adapted to engage a respective [weight] *one of said weights to retard rotation of said drive element*;

means biasing said weights inwardly, whereby the inertia forces created by said drive connection causes one or the other of said weights to engage a respective stop portion [first] depending on the direction of rotation in response to increasing angular velocity of said drive element.

20. The actuator of claim 19 wherein said means mounting said weights includes a common pivotal connection away from the center of gravity of said weights, and wherein said drive connection includes an arm drivingly connected to said drive element and to said pivotal connection, whereby said weights respond to both centrifugal and inertial forces.

21. The actuator of claim 19 wherein said means drivingly connecting said weights and said drive element includes a torque limit means limiting the torque transmitted therebetween.

22. A limited slip differential comprising:

a carrier housing;

a first and second side gears rotatably mounted in said carrier housing;

a plurality of planet pinions, rotatably mounted by said carrier housing, meshing with said first and second side gears;

clutch means for connecting said carrier housing and one of said side gears, including an engagement member carried by said one side gear, having cooperating surfaces therebetween to cause axial movement of said engagement member in response to relative rotative movement therebetween and also including means actuating said clutch means upon continued axial movement of said engagement member;

an actuator member, rotatably supported by said carrier housing;

means drivingly connecting said engagement member and said actuator member so as to cause rotation of said actuator member in response to relative rotation of said carrier housing and said engagement member;

means for braking said actuator member against said rotation in response to said actuator member attaining a predetermined angular velocity, whereby said engagement member is rotationally displaced relative said side gear in response to a predetermined level of differential action, thereby causing said clutch means to lock up said differential.

23. The differential of claim 22 wherein said braking means includes means varying said predetermined angular velocity responded to as at function of angular acceleration of said member.

24. The differential of claim 22 wherein said means drivingly connecting said actuator member and said engagement member is a geared connection therebetween.

25. The differential of claim 22 wherein said clutch means further includes a double coned portion connected to said engagement member and a cooperating pocket formed in said carrier housing and positioned to engage said double coned portion upon said continued axial movement of said engagement member.

26. The differential of claim 22 wherein said braking means includes a pair of weights mounted on said actuator member and drivingly connected thereto, and also includes means causing one or the other of said weights depending on the direction of rotation of said weights to move outwardly in response to the attainment of said angular velocity and also includes locking means creating a braking force on said actuator member in response to said movement of either of said weights.

27. The differential of claim 26 wherein said locking means includes means locking said weights to said carrier housing in response to the attainment of said angular velocity by said actuator member and wherein said driving connection between said actuator member and said weights includes a torque limiting means whereby the braking force exerted by said weights upon locking engagement with said carrier housing is limited to produce smooth engagement of said clutch means.

28. In a planetary differential having a plurality of driving members including an input and two output members the improvement comprising:

an actuator member;

driving means driving said actuator member in response to differential movement of said members;

a clutch mechanism operable to connect together the driving members of said differential;

actuation means producing actuation of said clutch mechanism by said actuator member in response to a predetermined drive level of said actuator member including means varying the predetermined drive level responded to as a function of the acceleration of said actuator member, whereby said driving members are connected together when a predetermined level of differential action occurs, varying as a function of the rate of change of differential action.

29. In a drive mechanism:

relatively rotatable driving and driven members;

clutch means located between said members and operable between a first condition wherein said members are capable of rotating relative to each other and a second condition operatively interconnecting said members to retard relative rotation between said members;

an actuator member for effecting operation of said clutch means to said second condition;

driving means driving said actuator member in response to relative rotation of said members;

actuation means producing actuation of said clutch means by said actuator member in response to a predetermined drive level of said actuator member, including means creating a locking force on said actuator member *and means responsive to the application of a locking force to said actuator member for actuating said clutch means* whereby said members are locked up when a predetermined level of relative rotation occurs therebetween.

30. In a drive mechanism:

a driving member;

a driven member;

clutch means located between said members and operable upon axial loading thereof to retard relative rotation of said members;

said clutch means including an engagement member carried by one of said members;

said one of said members, and said engagement member having cooperating surfaces effecting axial loading of said clutch means in response to relative rotative movement therebetween;

an actuator member rotatably supported by the other of said members;

means for driving said actuator member in response to relative rotation between said members;

means for braking said actuator member against said rotation in response to said actuator member [attainin] *attaining* a predetermined angular velocity;

said actuator member and engagement member having cooperating portions effecting relative rotation of said engagement member relative to said one of said members upon braking of said actuator member to thereby effect axial loading of said clutch means and retardation of relative rotation between said members.

31. A centrifugal actuator comprising:

a drive element;

weight means;

means rotatably mounting said weight means with respect to said drive element so as to allow for rotation thereof away from said drive element;

means drivingly connecting said weight means and said drive element so as to cause said weight means to rotate with said drive element and including a connection therebetween which creates inertia forces tending to rotate the weight means in directions tending to move at least a portion of said weight means toward and another portion of said weight means away from said drive element in response to an angular acceleration of said drive element in one direction and tending to move said portions of said weight means in opposite relative directions in response to [acceleraton] *acceleration* of said drive element in the other direction;

means engaging said weight means upon a predetermined travel away from drive element including stop portions adapted to engage the respective portions of said weight means;

means biasing said weight means inwardly whereby the inertia forces created by said drive connection causes one or the other of said portions of said weight means to engage a respective stop portion first depending on the direction of rotation in response to increasing angular velocity of said drive element.

*32. A differential drive assembly comprising:*

*an input member,*

*a rotatable output member,*

*differential gear means for drivingly connecting said input member with said output member and for enabling relative rotation to occur between said input and output members,*

*clutch means operable from a disengaged condition to an engaged condition to retard relative rotation between said input and output members, and*

*actuator means for effecting operation of said clutch means to the engaged condition in response to a predetermined rate of relative rotation between said input and output members, said actuator means including an actuator member, drive means for moving said actuator member at a rate which varies as a function of variations in the speed of relative rotation between said input and output members, means for developing a force which is effective to retard movement of said actuator member at least when the predetermined speed of relative rotation is present between said input and output members, and means for effecting operation of said clutch means to the engaged condition in response to retardation of movement of said actuator member.*

*33. A differential drive assembly as set forth in claim 32 further including means for supporting said actuator member for rotation about its central axis, said drive means being effective to rotate said actuator member about its central axis at a speed which varies as a function of variations in the speed of relative rotation between said input and output members.*

*34. A differential drive assembly as set forth in claim 32 further including means for rendering said actuator means ineffective to effect operation of said clutch means in response to rotation of said input member at a speed which is greater than a predetermined speed.*

*35. A differential drive assembly as set forth in claim 32 wherein said input member includes a carrier, said actuator member being disposed on said carrier for movement therewith, said differential gear means includes a side gear and a pinion gear, said clutch means includes a first clutch surface connected with said carrier and a second clutch surface connected with said side gear, said drive means including means connected with said second clutch surface and said side gear for effecting movement of said actuator member at a rate which varies as a function of the rate of relative rotation between said carrier and side gear, said means for effecting operation of said clutch means to the engaged condition including means for urging said first and second clutch surfaces toward each other.*

References Cited

The following references, cited by the Examiner, are of record in the patented file of this patent or the original patent.

UNITED STATES PATENTS

| | | | |
|---|---|---|---|
| 2,550,750 | 5/1951 | Abelt | 74—711 |
| 2,720,796 | 10/1955 | Schou | 74—711 |
| 3,448,636 | 6/1969 | Roper et al. | 74—711 |
| 3,517,573 | 6/1970 | Roper | 74—711 |

FOREIGN PATENTS

| | | | |
|---|---|---|---|
| 183,712 | 8/1922 | Great Britain | 74—711 |
| 583,974 | 1/1947 | Great Britain | 74—711 |
| 1,103,795 | 2/1968 | Great Britain | 192—103 C |

ARTHUR T. McKEON, Primary Examiner

U.S. Cl. X.R.

192—35